United States Patent
Dennis

(10) Patent No.: US 7,131,702 B2
(45) Date of Patent: Nov. 7, 2006

(54) SEATED OCCUPANT IMPACT-INJURY MINIMIZING METHOD

(75) Inventor: Michael R. Dennis, Scappoose, OR (US)

(73) Assignee: MJD Innovations, L.L.C., Scappoose, OR (US)

( * ) Notice: Subject to any disclaimer, the term of this patent is extended or adjusted under 35 U.S.C. 154(b) by 219 days.

(21) Appl. No.: 10/859,844

(22) Filed: Jun. 2, 2004

(65) Prior Publication Data

US 2004/0217617 A1 Nov. 4, 2004

Related U.S. Application Data

(62) Division of application No. 10/426,103, filed on Apr. 29, 2003, now Pat. No. 6,789,844.

(51) Int. Cl.
*B60N 2/44* (2006.01)

(52) U.S. Cl. .................................. 297/463.2

(58) Field of Classification Search ........... 297/216.17, 297/216.1, 452.56, 463.2; 29/91.1, 428
See application file for complete search history.

(56) References Cited

U.S. PATENT DOCUMENTS

| | | | |
|---|---|---|---|
| 3,080,579 A | 3/1963 | Gordon | |
| 4,492,408 A | 1/1985 | Lohr | |
| 4,842,257 A | 6/1989 | Abu-Isa et al. | |
| 4,910,817 A | 3/1990 | Kita | |
| 5,013,089 A | 5/1991 | Abu-Isa et al. | |
| 5,393,126 A | 2/1995 | Boulva | |
| 5,441,331 A | 8/1995 | Vento | |
| 5,632,526 A | 5/1997 | McLarty, III et al. | |
| 5,669,661 A | 9/1997 | Pajon | |
| 5,735,578 A | 4/1998 | Penley | |
| 5,833,267 A | 11/1998 | Cordes et al. | |
| 5,842,669 A * | 12/1998 | Ruff | 244/122 R |
| 6,003,937 A | 12/1999 | Dutton et al. | |
| 6,152,534 A | 11/2000 | Maeda et al. | |
| 6,193,318 B1 | 2/2001 | Becker et al. | |
| 6,378,949 B1 | 4/2002 | Maeda et al. | |
| 6,561,580 B1 | 5/2003 | Bergey | |
| 6,604,792 B1 | 8/2003 | Picard | |
| 6,675,269 B1 | 4/2004 | Maeda et al. | |

* cited by examiner

*Primary Examiner*—Milton Nelson, Jr.
(74) *Attorney, Agent, or Firm*—Jon M. Dickinson PC; Robert D. Varitz PC

(57) ABSTRACT

A shock-load G-force minimizing seat structure and injury-minimizing methodology wherein the seat structure responds principally in non-springy compression, rather than in spring-loading bending, to vertically directed shock loads. The seat structure features an anti-springy frame structure which supports a thin and very lightweight seat cushion support spanner web formed preferably of a non-stretchy material, such as a material made out of elongate carbon-fiber strands.

2 Claims, 5 Drawing Sheets

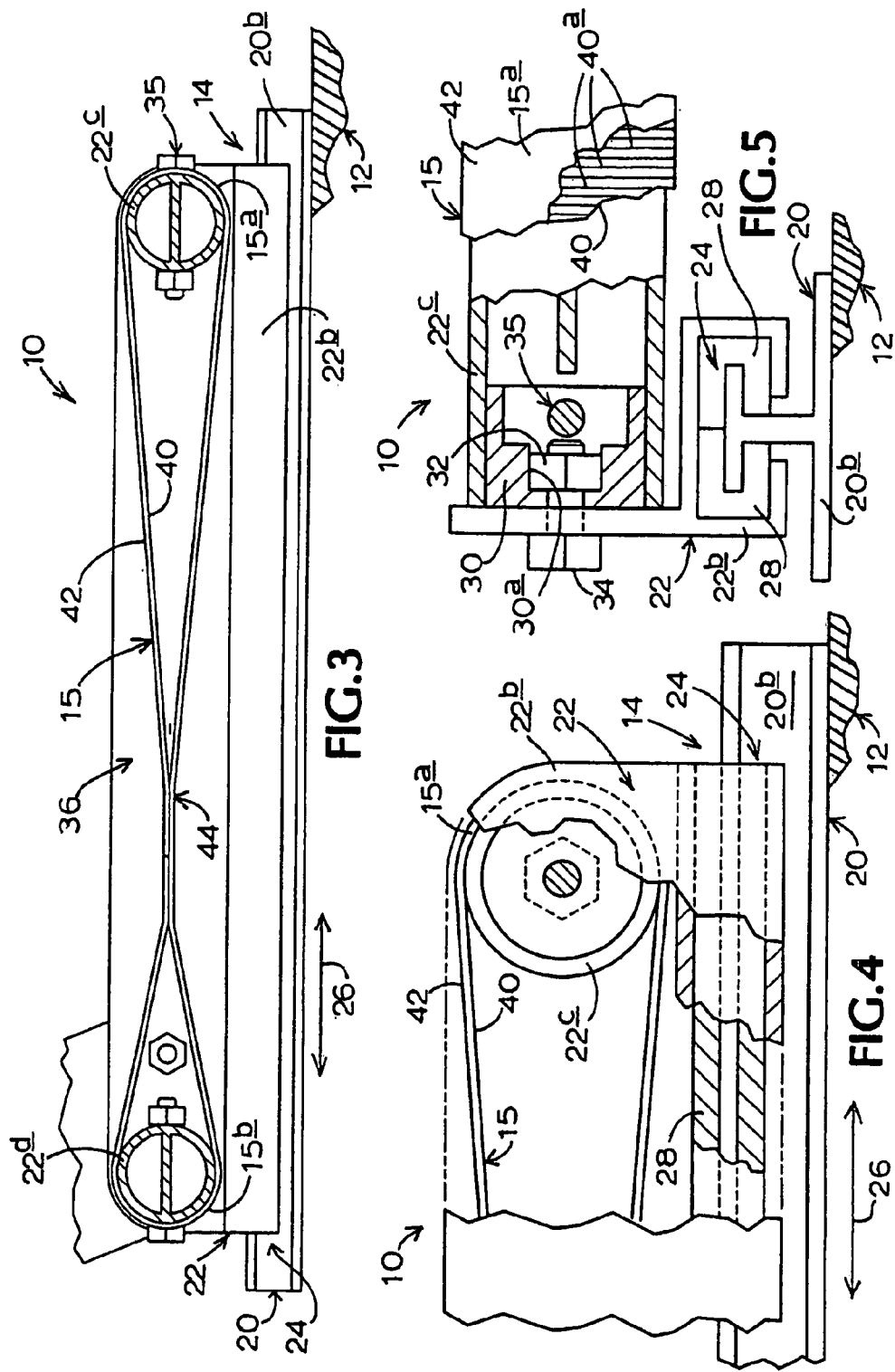

SEATED OCCUPANT IMPACT-INJURY MINIMIZING METHOD

CROSS REFERENCE TO RELATED APPLICATION

This application is a division, and claims the priority filing date, of application Ser. No. 10/426,103, filed Apr. 29, 2003 now U.S. Pat. No. 6,789,844 for invention of Michael R. Dennis for "Seat Structure with Anti-Spring Spanner Element". The entire contents of that application are hereby incorporated herein by reference.

BACKGROUND AND SUMMARY OF THE INVENTION

This invention pertains to seat structure, and in particular to methodology associated with anti-spring, web spanner structure for supporting an occupant-seating cushion in seat structure designed for use in the setting of high-speed vehicle, such as an aircraft, to minimize injuries in hard and/or catastrophic impact events. The method of the invention also pertains to the use of such seat structure which further includes an anti-spring, compression-load seat-base structure.

Conventional seat design, insofar as it has been aimed at minimizing injuries caused from a hard "bottoming-out" event, such as in a crash landing in an aircraft, have typically introduced structural arrangements which, unfortunately, and to some extent accidentally, tend to exacerbate the impact-injury problem. Such design often utilizes a collapsing or "stroking" behavior in an effort to minimize the total load delivered to a seat occupant. This approach, however, frequently introduces undesirable weight, complexity, and expense issues, and also additionally enhances "springiness" in a seat structure—a situation that can actually lead to an amplification of damaging accelerations applied to a seat occupant's spine. Increased springiness, counter-intuitive as this may seem, introduces an enlarged rebound counter-acceleration fractions of a second after a dangerous impact occurs, and such increased counter-acceleration significantly contributes to serious, and often fatal, injury.

The methodology of the present invention addresses this issue with an innovative seat structure which, in use, is interposed a seat occupant and a vehicle frame, such as an aircraft frame, and which possesses substantially no spring-loading and spring-back behavior. This seat structure, disclosed in the environment of an aircraft, and in a preferred and best mode embodiment and manner of use which are specifically illustrated and described herein, features a very thin, occupant-cushion-supporting spanner web formed of substantially non-stretchy and non-springy strand material, such as elongate carbon fiber, or Kevlar®, strand material, which is deployed under very modest tension between a pair of transverse, spaced, parallel, elongate and very robust cylindrical tubes. These tubes are carried on an adjustable, selectively fore and aft repositionable, slider sub-frame which, in turn, rides slideably on a pair of spaced, lateral and parallel I-beam-like rails (seat-frame substructures) which are, effectively, directly anchored to the aircraft frame. The mechanism furnished for enabling selectable slide repositioning, and positional unlocking and locking associated with this capability, do not form any part of the present invention, and are neither described nor illustrated herein.

These components of the seat frame—tubes, slider mechanism, rails and associated structures—load principally in very modest-deflection compression, rather than in bending, and consequently make an important contribution to the non-spring-back performance of the entire seat-structure. The spanner web, non-stretchable as it is, offers an extremely light weight, thin-format direct cushion support structure which also specially exhibits substantially no spring-loading, spring-back response to loading activity, such as an impact-produced sharp, high-level accelerative loading.

These and other features and advantages which are offered by the present invention will become more fully evident and appreciated as the description that now follows is read in conjunction with the accompanying drawings.

DESCRIPTION OF THE DRAWINGS

FIG. 1 includes a fragmentary illustration of an aircraft's frame structure with respect to which this seat-structure is anchored.

FIGS. 3–5, inclusive, each presents an even larger-scale, fragmentary view (partially cross-sectional) of structural details taken along the lines 3—3, 4—4, and 5—5, respectively, shown in FIG. 2.

DETAILED DESCRIPTION OF THE INVENTION

Turning now to the drawings, and referring first of all to FIGS. 1–5, inclusive, shown generally at 10 is a preferred and best-mode anti-spring-back seat structure which is constructed for operation in accordance with the present invention. Very specifically, this illustrated seat-structure is constructed in accordance with a preferred and best mode embodiment of and manner of practicing the invention. Illustrated fragmentarily at 12 is structure that represents an aircraft frame with regard to which seat-structure, or seat, 10 is suitable rigidly anchored.

Figure 1:
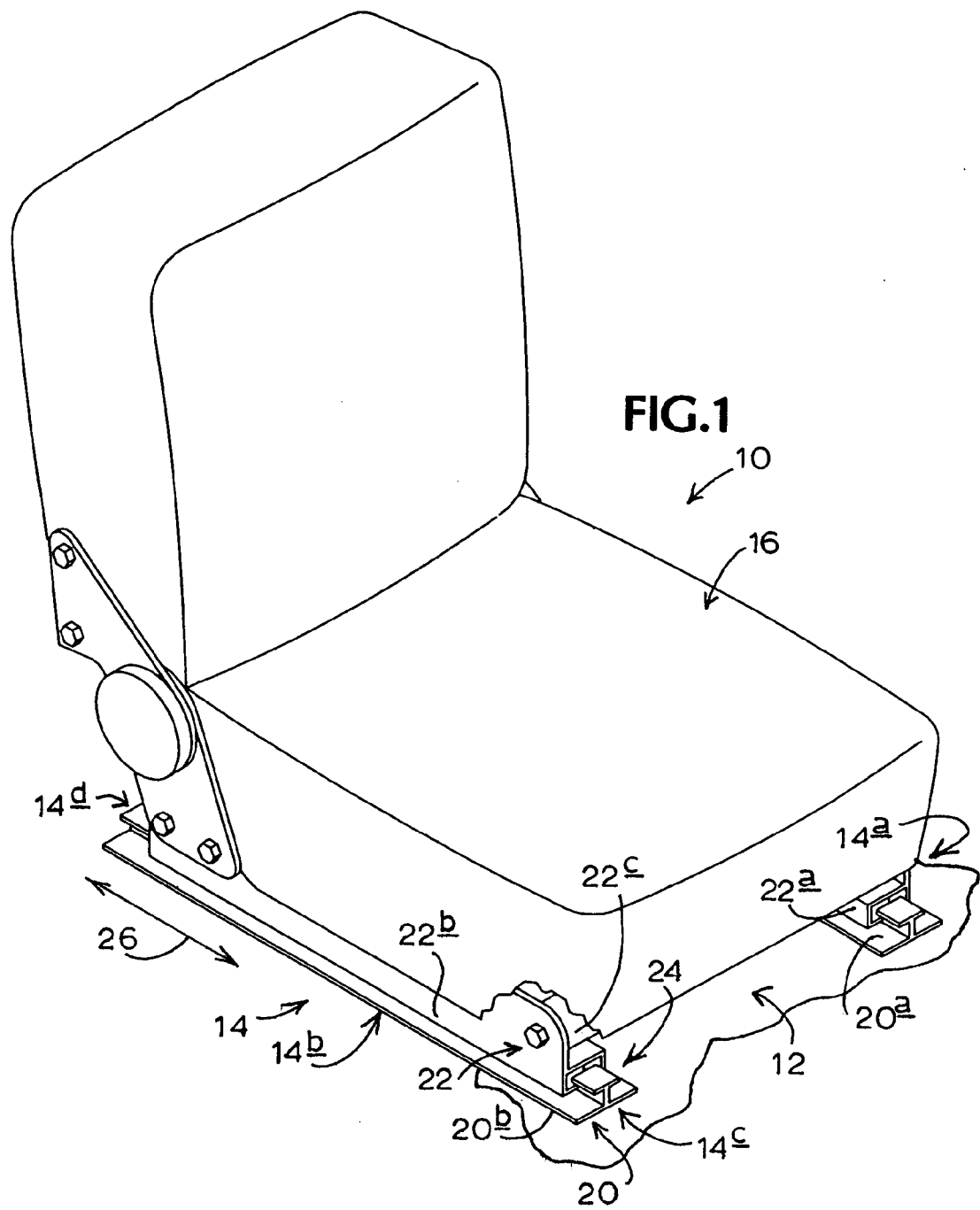
FIG. 1 presents an isometric, side-frontal view of a preferred and best mode embodiment of seat-structure constructed in accordance with the invention.
Figure 2:
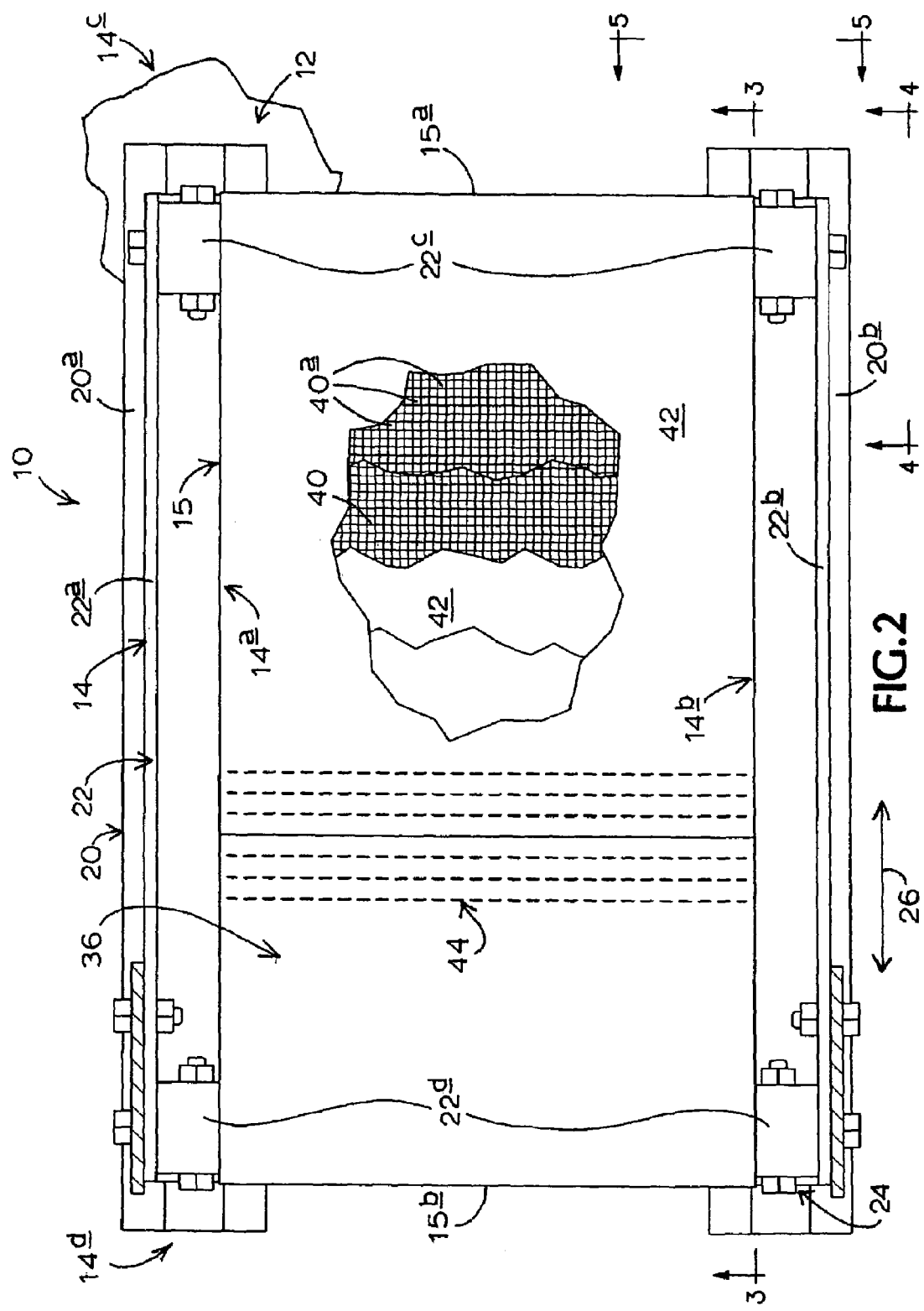
FIG. 2 gives a larger-scale, top-plan view (with seat-back structure removed) of what is shown in FIG. 1.

Seat 10 includes a non-springy, rigid frame 14, and mounted thereon, as will be described, a thin, nominally flexible, substantially unstretchable spanner web 15 of material which is intended to support an appropriate, direct occupant-supporting cushion which is shown at 16 in FIG. 1. The design and construction of this cushion form no part of the present invention, but preferably, cushion 16 is made of a somewhat "soft" material which does not possess a springy nature.

Frame 14 includes lower and upper sub-frames 20, 22 respectively, which are functionally united, in the region designated 24, for selected fore-and-aft relative positional sliding and adjustment as is represented by double-ended arrow 26. The left and right lateral sides of frame 14 (from an occupant's point of view) are shown at 14a, 14b (see particularly FIGS. 1 and 2), and the front and rear sides of this frame are shown at 14c, 14d, respectively.

Lower sub-frame 20, also referred to herein as a mounting structure, includes two, elongate, laterally spaced, substantially parallel side members 20*a*, 20*b*. These side members have a kind of I-beam-like cross section, with different-width upper and lower flanges joined by a central upright web, as shown. Members 20*a*, 20*b* are suitably anchored to the aircraft frame.

Upper sub-frame 22 includes two, elongate, laterally spaced, substantially parallel side members 22*a*, 22*b*, each of which has the cross-sectional configuration clearly illustrated in FIG. 5. As can be seen, the lower portion of each of these side-members has a downwardly facing, somewhat C-shaped look. Projecting upwardly from this lower portion is a substantially vertically disposed web which resides at the laterally outer sides of members 22*a*, 22*b*. Members 22*a*, 22*b* are slideably mounted on members 20*a*, 20*b*, respectively, in lower sub-frame 20, with the C-shaped lower portions of members 22*a*, 22*b* receiving the upper flanges of members 20*a*, 20*b*, respectively. Low-friction-material shoes 28, made of a material such as ultra high molecular weight polyethylene (UHMWPE), are interposed these four lateral members (20*a*, 20*b*, 22*a*, 22*b*) as shown (see particularly FIGS. 4 and 5).

As was mentioned earlier, an appropriate mechanism (not shown) is provided for allowing a seat occupant selectively to adjust (in a lockable and unlockable manner) the fore and aft positions of members 22*a*, 22*b* on members of 20*a*, 20*b*.

Further included in upper sub-frame 22 are elongate, front and rear, transverse members 22*c*, 22*d*, respectively. These members, which are referred to herein as web anchor members, each has a stout, cylindrical/tubular configuration, with a central strengthening web which is partially removed adjacent opposite ends to accommodate the installation of closure end caps, such as end cap 30 which is shown in FIG. 5. With specific reference to each end cap 30, each cap includes a central, inwardly facing, hexagonal socket 30*a* which, in a sliding-fit fashion, receives a hexagonal nut 32 that receives a mounting bolt 34 which functions to anchor one end of the associated tubular member to the upright web in a upper sub-frame lateral member (22*a*, 22*b*). A cross-nut-and-bolt assembly 35 is employed to capture each end cap within an end of one of the tubular members, with each hex nut 32 being initially freely received in a socket 30*a* prior to assembly of each tubular member with an end of one of members 22*a*, 22*b*. Collectively, members 22*a*, 22*b*, 22*c*, 22*d* define what is referred to herein as a rectangular, personnel support span, or region, 36 (see particularly FIGS. 2 and 3).

The several elongate components which make up the lower and upper sub-frames in seat-structure 10 exhibit substantially no springy bending under circumstances where a vertical load, such as an impact/shock load, is delivered between a seat occupant and the frame of the aircraft. Rather, these components respond to such a load primarily in compression. This is an important feature of the present invention.

Figure 6:
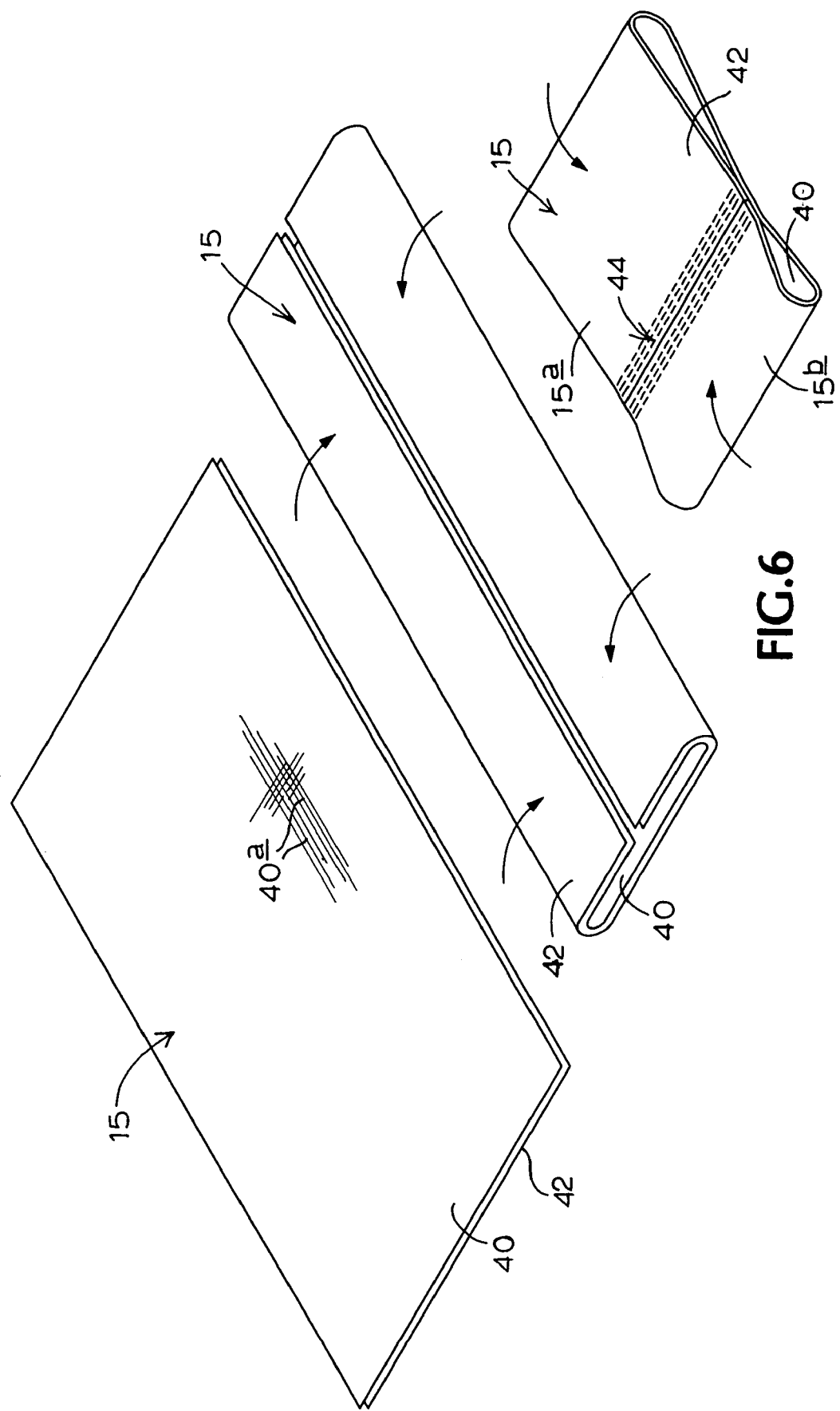
FIG. 6 presents three, story-telling, isometric views which describe, at least in part, assembly of the cushion-supporting spanner structure which is employed in the seat structure of the present invention.

Suitably anchored to members 22*c*, 22*d*, and substantially entirely spanning previously mentioned rectangular region 36, is previously mentioned spanner web 15. Referring to FIG. 6 along with FIGS. 1–5, inclusive, web 15 is effectively a two-layer structure, including preferably an inner layer 40 and a jacketing, outer layer 42. Inner layer 40 is formed of a substantially non-stretchable strand material, such a Kevlar® fabric material, which includes plural, elongate strands 40*a* (see FIGS. 2, 5 and 6) that end up extending in a fore-and-aft direction between upper sub-frame members 22*c*, 22*d*. Layer 40 is preferably woven in nature, with cross fibres or strands having an orthogonal relationship. Outer jacketing layer 42 is formed preferably of rip-stop Nylon®.

FIG. 6 shows how spanner web 15 may be formed. The several stages of construction are pictured in a quite self-explanatory way from left-to-right in the three views which are presented in FIG. 6. Stitching 44 (FIGS. 2, 3 and 6) binds opposite ends of the effectively continuous loop of the spanner web in final stages of construction. The finished "loop" has a somewhat "figure-8" (with a flattened, offset center) configuration as viewed from a lateral side, or edge, of the loop. This configuration gives the spanner web a pair of opposite-end (front and rear) reverse loops 15*a*, 15*b*, respectively.

While this spanner web has been described in conjunction with formation from a Kevlar®-strand woven fabric material, it should be understood that other similar and suitable materials are and may become available made out of, for example, carbon-fiber material.

The completed spanner web is installed on sub-frame members 22*c*, 22*d* as shown, with the installed web nominally possessing a certain modest amount of tension whereby it does not sag between these sub-frame members.

Figure 7:
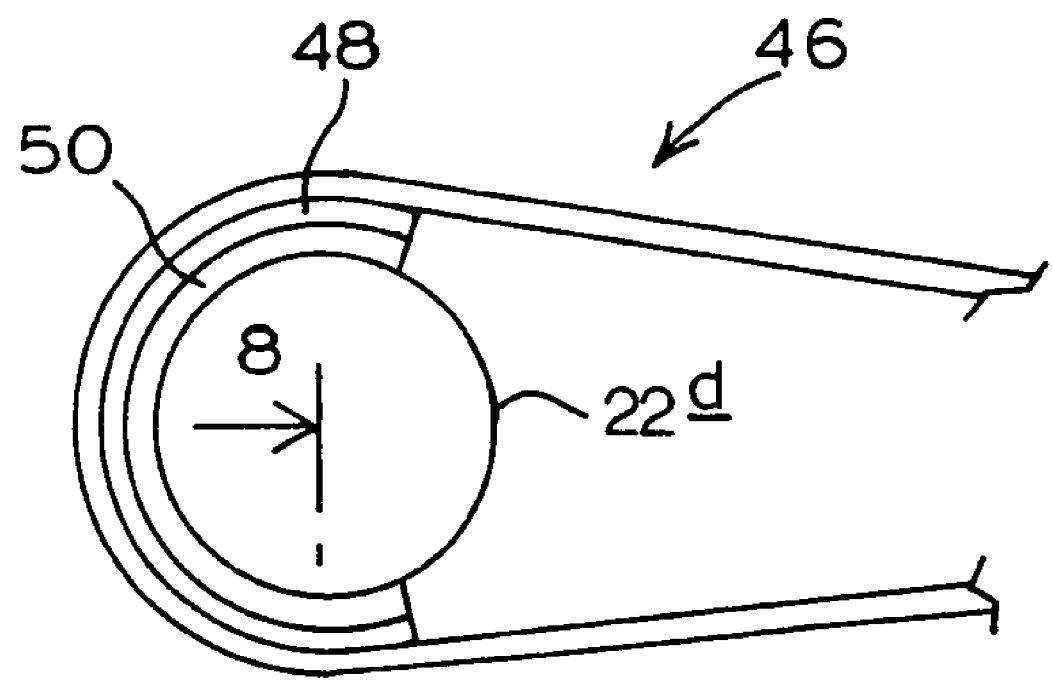
FIG. 7 is a simplified fragmentary detail illustrating one modified form of the invention.
Figure 8:
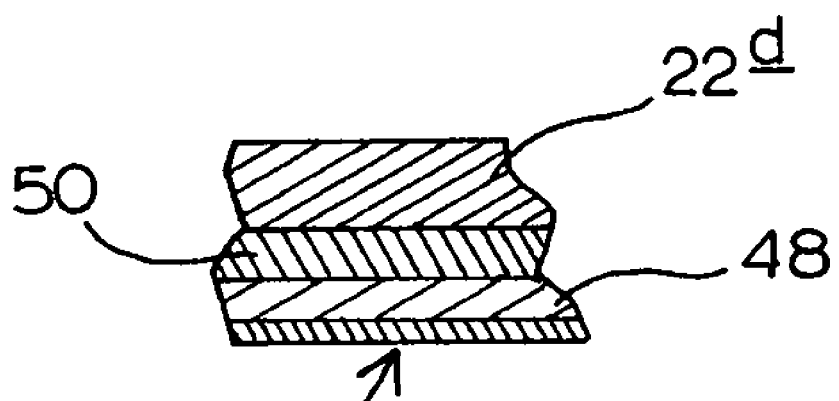
FIG. 8 is a fragmentary cross section taken generally along the line 8—8 in FIG. 7.

FIGS. 7 and 8 illustrate a somewhat modified form of spanner-web construction and mounting. Here, such a modified web is shown fragmentarily at 46. With regard to this modified web, the modifications exist at the two, opposite-end reverse bends which loop around upper sub-frame members 22*c*, 22*d*. Specifically, at these two locations, two additional web layers 48, 50 have been added so that they lie intermediate previously described outer layer 42 and members 22*c*, 22*d* when the web is mounted in place. Layer 48 is joined directly to layer 42, and is formed of an appropriate load-spreading material, such as Poron® 90. Layer 50 is joined to layer 48, and is preferably formed of an acceleration-rate-sensitive material, such as any one of the specific viscoelastic materials known as CF-42, CF-45, and CF-47.

Operational Description

With an occupant in seat 10, substantially the full weight of that occupant is borne by the spanner web. The web carries this load in non-stretching tension. From the spanner web, occupant load is transferred directly and dividedly to upper sub-frame 22 via front and rear tubular members 22*c*, 22*d*, respectively, which respond to such load transfer, at least insofar as vertical load components are concerned, in compression rather than in springy bending. From members 22*c*, 22*d*, this divided occupant load is transferred in compression to upper sub-frame members 22*a*, 22*b*, through which members this transferred load is delivered in compression through shoes 28, and lower sub-frame members 20*a*, 22*b*, in compression, to the aircraft frame.

In the event of a catastrophic or other vertically jolting occurrence, G-loads delivered to an occupant through seat 10 upon initial impact will not cause any noticeable spring-back, vertical loading to occur in any portion of seat 10. Hence, there will not occur any springy rebound in the seat frame and spanner web structure, and in particular not any rebound of the kind that we have learned is heavily responsible for delivering extremely damaging, and even fatal, injuries to a seat occupant. "Crash" tests performed with regard to the seat of this invention, with respect to "numbers" generated that relate to injury causation, are remarkably low, and have proven to be, consistently and repetitively, well below established "danger" thresholds. One important key to this remarkable behavior is the fact that, in sharp distinction relative to conventional seat structures, the seat structure of this invention does not introduce a damaging rebound response to impact events.

Accordingly, a preferred embodiment and methodology of the present invention have been described and illustrated herein. Counter-intuitively, the structure and methodology of this invention furnish a seat support structure including spanner web structure which, by reducing almost to non-noticeablity any spring rebound action with respect to a catastrophic vertical load imposed by a seat occupant on the seat structure, damaging G-force transmission to that occupant is significantly minimized. Those who are skilled in the art, after reading and reviewing the description and illustrations herein regarding this invention will appreciate that variations and modifications may be made without departing from the spirit of the invention.

We claim:

1. A method of minimizing G-force impact injury to a person seated in a vehicle which has a non-springy vehicle frame comprising creating a non-collapsing, non-vertical-motion person-seating structure which exhibits substantially no vertical motion and no spring-loading-type rebound to a vertical compressive shock introduced to this structure, and following said creating, anchoring the created person-seating structure effectively directly to the vehicle frame.

2. A method of minimizing G-force impact injury to person seated in a vehicle which has a non-springy vehicle frame comprising providing person-seating frame structure with a sub-frame whose structure responds to seated-occupant-introduced loads in compression and without any appreciable flexing and bending, and which includes an open span adapted to be spanned by a web of fabric material, spanning the sub-frame span by anchoring such a web to the sub-frame, with the web being formed with elongate material strands that are non-stretchable, and utilizing the assembled combination of the sub-frame, the span and the spanning fabric web to react to loads introduced thereto by a seated person substantially without any springy response.

* * * * *